United States Patent
Suzuki et al.

(10) Patent No.: US 8,991,656 B2
(45) Date of Patent: Mar. 31, 2015

(54) CONTAINER

(75) Inventors: Yutaka Suzuki, Niigata (JP); Takayuki Nagai, Hyogo (JP)

(73) Assignees: Welcon Inc., Niigata-shi (JP); Yamato Scale Co., Ltd., Akashi-shi (JP)

( * ) Notice: Subject to any disclaimer, the term of this patent is extended or adjusted under 35 U.S.C. 154(b) by 0 days.

(21) Appl. No.: 13/881,202

(22) PCT Filed: Oct. 31, 2011

(86) PCT No.: PCT/JP2011/075071
§ 371 (c)(1),
(2), (4) Date: Apr. 24, 2013

(87) PCT Pub. No.: WO2012/057353
PCT Pub. Date: May 3, 2012

(65) Prior Publication Data
US 2013/0216338 A1    Aug. 22, 2013

(30) Foreign Application Priority Data

Oct. 29, 2010    (JP) .................................. 2010-244429

(51) Int. Cl.
*B67D 7/06*    (2010.01)
*B65D 88/54*   (2006.01)
*B21D 5/00*    (2006.01)
(Continued)

(52) U.S. Cl.
CPC ................. *B65D 88/54* (2013.01); *B65B 37/00* (2013.01); *B21D 5/00* (2013.01); *B65B 1/32* (2013.01); *B65B 37/18* (2013.01); *G01G 19/393* (2013.01)
USPC ....................................... 222/185.1; 222/344

(58) Field of Classification Search
CPC .... B65D 88/54; B65D 90/00; B65D 90/0006; B65B 1/32; B65B 37/18; B65B 37/00; B65B 35/10; G01G 19/393
USPC ........... 222/344–352, 305, 185.1, 180, 181.1, 222/181, 2, 58, 77; 220/678–680, 689, 690; 105/247–253; 177/52–59, 119, 149
See application file for complete search history.

(56) References Cited

U.S. PATENT DOCUMENTS 3,572,252 A * 3/1971 Coover et al. ................. 105/248
4,228,742 A * 10/1980 Przybylinski et al. ........ 105/248
(Continued)

FOREIGN PATENT DOCUMENTS

CN    101444873    6/2009
CN    101474744    7/2009
(Continued)

OTHER PUBLICATIONS

Office Action issued Mar. 18, 2014, in Chinese Patent Application No. 201180052694.8.
(Continued)

*Primary Examiner* — Lien Ngo
(74) *Attorney, Agent, or Firm* — Oblon, McClelland, Maier & Neustadt, L.L.P.

(57) ABSTRACT

A weighing hopper includes a tubular main body having an upper end opening constituting a loading port and a lower end opening constituting a dispensing port and a gate provided on the main body swingably in such a way that the gate opens/closes the dispensing port, wherein the main body and the gate are formed by bending components after joining the components by diffusion.

8 Claims, 5 Drawing Sheets

(51) Int. Cl.
    B65B 1/32    (2006.01)
    B65B 37/18   (2006.01)
    G01G 19/393  (2006.01)
    B65B 37/00   (2006.01)

(56) References Cited

U.S. PATENT DOCUMENTS

| | | | | |
|---|---|---|---|---|
| 4,382,527 | A * | 5/1983 | Lerner | 222/56 |
| 4,588,651 | A * | 5/1986 | Israeli | 428/594 |
| 5,767,453 | A * | 6/1998 | Wakou et al. | 177/25.18 |
| 5,934,200 | A * | 8/1999 | Lydic | 105/248 |
| 6,756,546 | B2 * | 6/2004 | Komatsu | 177/25.18 |
| 7,861,659 | B2 * | 1/2011 | Gillis et al. | 105/248 |
| 2005/0121498 | A1 | 6/2005 | Franchet et al. | |
| 2009/0139646 | A1 | 6/2009 | Ohashi et al. | |

FOREIGN PATENT DOCUMENTS

| | | |
|---|---|---|
| JP | 3 113339 | 5/1991 |
| JP | 9 196746 | 7/1997 |
| JP | 11-057084 | 3/1999 |
| JP | 2000 261266 | 9/2000 |
| JP | 2003 287459 | 10/2003 |
| JP | 2006-255746 | 9/2006 |
| JP | 2007 10448 | 1/2007 |
| JP | 2010 105742 | 5/2010 |

OTHER PUBLICATIONS

Japanese Office Action Issued Aug. 1, 2012 in in JP Patent Application No. 2010-244429 Filed Oct. 29, 2010 (with English translation).
International Search Report Issued Dec. 6, 2011 in PCT/JP11/75071 Filed Oct. 31, 2011.
Office Action issued Apr. 22, 2014, in Japanese Patent Application No. 2012-540989 (with English language translation).

* cited by examiner

CONTAINER

FIELD

The present invention relates to a container, and more particularly to a container such as a hopper that constitutes an automatic combination scale or the like, for example, and that temporarily retains an object such as food and medicine loaded through a loading port and dispenses through a dispensing port as required.

BACKGROUND

Conventionally, as a container such as a hopper constituting an automatic combination scale, for example, the following is known. The known container includes: a tubular main body having an upper end opening constituting a loading port, and a lower end opening constituting a dispensing port; and a gate as an opening/closing member provided swingably in a way that the opening/closing member opens/closes the dispensing port.

In the container as described above, the dispensing port is closed in normal state with the gate moved to close. Therefore, food loaded through the loading port can be temporarily retained in the inside. Then, when the dispensing port is opened with the gate moved to open by a given dispense instruction, the container dispenses the food temporarily retained therein through the dispensing port toward a chute that is provided in a region below the container (refer to Patent Literature 1, for example).

CITATION LIST

Patent Literature

Patent Literature 1: Japanese Patent Application Laid-open No. 2010-105742

SUMMARY

Technical Problem

In general, in the container as described above, components of the main body, and components of the gate are respectively joined by spot welding, laser welding, or the like, which is not clearly described in patent literature 1.

Therefore, components of the main body, and components of the gate are respectively joined in a line or at a point, and thus a gap exists between the components. As a result, a part of food as an object may enter between the components, which may cause a situation that is not preferable from a hygiene standpoint.

The present invention is made in view of the above-described situation and an object thereof is to provide a container capable of making its sanitary property preferable.

Solution to Problem

To achieve the object, a container according to one aspect of the present invention includes: a main body, at least an inner surface of which is used to deliver an object, wherein the main body is formed by bending components after joining the components by diffusion bonding.

Moreover, in the above-described aspects, the main body can be formed in a tubular shape of which upper end opening constitutes a loading port and a lower end opening constitutes a dispensing port, the container can further include an opening/closing member provided on the main body swingably in a way that the opening/closing member opens/closes the dispensing port, and the main body and the opening/closing member can be formed by bending their components after joining their components by diffusion bonding.

Moreover, in the above-described aspect, at least one of the main body and the opening/closing member can be formed by bending the components after joining components by diffusion bonding and embossing a portion to form an inner surface of the container.

Moreover, in the above-described aspects, at least one of the main body and the opening/closing member can be formed by embossing a portion to form an inner surface of the container after joining the components by diffusion bonding and bending the components.

Moreover, in the above-described aspects, at least one of the main body and the opening/closing member can be made of stainless.

Advantageous Effects of Invention

According to the container of the present invention, the main body is formed by joining components by diffusion bonding, and thereafter bending the components. Thus, an interface between the components disappears, and the components can be an integrated structure without any gap between the components. Therefore, a situation where a part of object enters between the components of the main body can be prevented, and the container can be hygienic. Consequently, the container has an effect of making its sanitary property preferable.

DESCRIPTION OF EMBODIMENTS

A preferable embodiment of a container according to the present invention will be hereinafter described in detail referring to the attached drawings.

Figure 1:
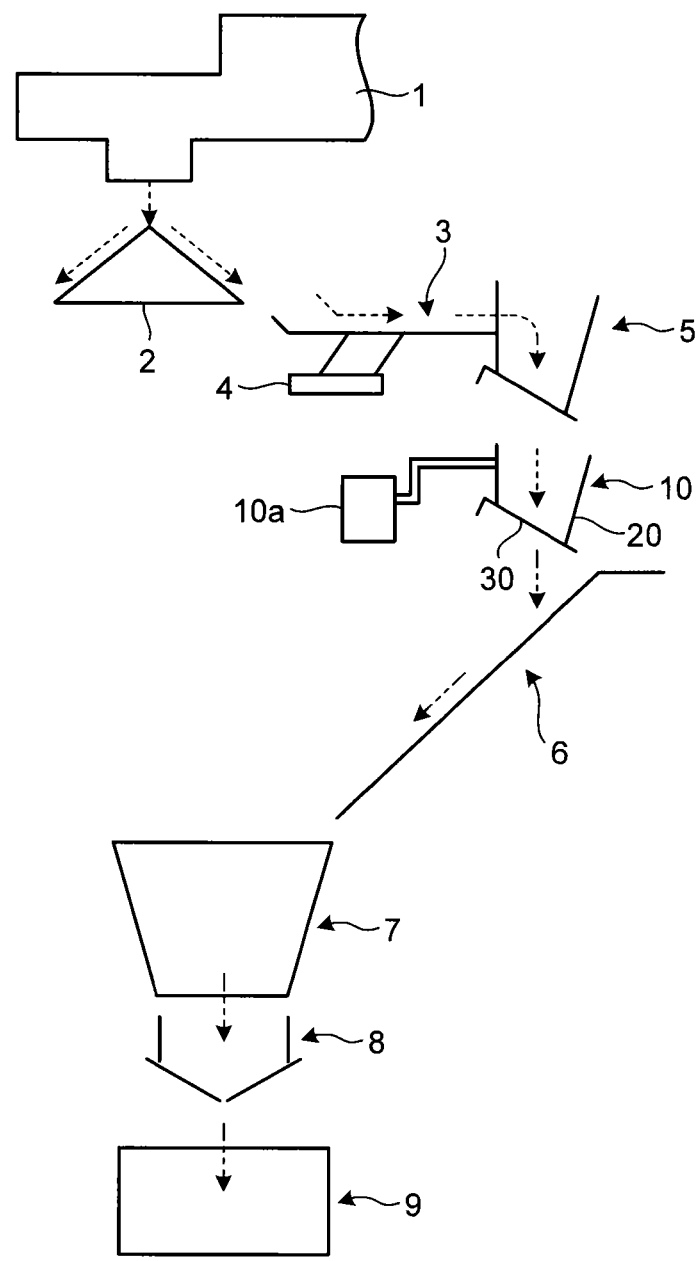
FIG. 1 is a schematic view schematically illustrating a structure of an automatic combination scale, in which a hopper as a container that is an embodiment of the present invention is used as a weighing hopper.

FIG. 1 is a schematic view schematically illustrating a structure of an automatic combination scale, in which a hopper as an example of a container of an embodiment of the present invention is used as a weighing hopper. The automatic combination scale exemplified here is structured to include: a distribution feeder 2; a weighing hopper 10; and a collecting hopper 8. Because the structure of the automatic combination scale is substantially identical with a conventionally known one except for the weighing hopper 10, respective components will be briefly described.

The distribution feeder 2 supplies food supplied from a cross head feeder 1 by distributing it to a plurality of linear feeders 3 provided radially. The linear feeder 3 supplies the food supplied from the distribution feeder 2 to a feed container 5 by delivering it to the tip end side of the linear feeder 3 itself by vibration of a vibrator 4.

A plurality of the weighing hoppers 10 are provided, and each of the weighing hoppers 10 is arranged in a region below the feed container 5. The weighing hoppers 10 as described above are for temporarily retaining the food supplied from the feed containers 5. Each of the weighing hoppers 10 is configured in such a manner that a weight value of food retained therein is detected by a load detector 10a.

Note that the weight values of food retained in these weighing hoppers 10 are used for a combination calculation by a calculating device (not illustrated), and the calculating device selects a combination having a total weight within an acceptable weight range. The calculating device then gives a dispense instruction to selected weighing hoppers 10. Each of the weighing hoppers 10 dispenses food retained therein to a chute 6 provided in a region below the weighing hopper 10 when the dispense instruction is given from the calculating device. The food dispensed to the chute 6 is collected at a collecting chute 7, and then supplied to the collecting hopper 8.

The collecting hopper 8 collects and temporarily retains the food dispensed from arbitrary selected weighing hoppers 10, and then supplies the food to a packaging machine 9 arranged in a region below the collecting hopper 8. The food supplied to this packaging machine 9 will be packaged.

Figure 2:
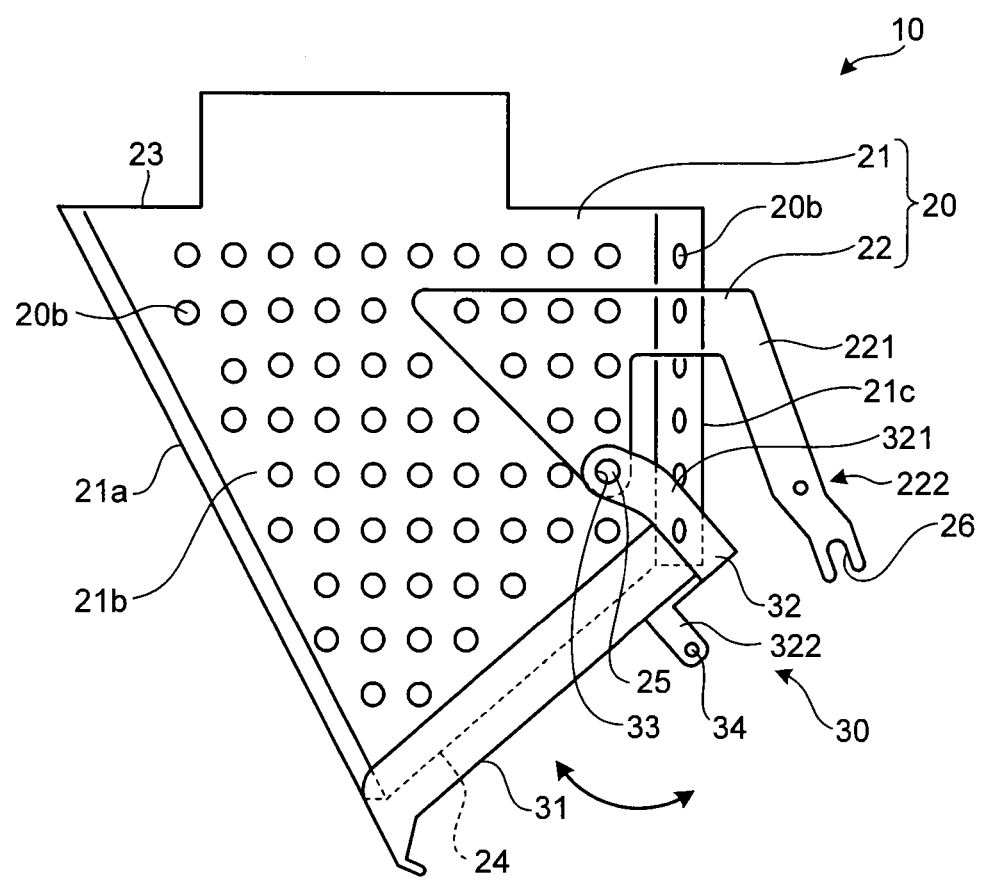
FIG. 2 is a side view schematically illustrating the weighing hopper illustrated in FIG. 1.

FIG. 2 is a side view schematically illustrating the weighing hopper 10 illustrated in FIG. 1. The weighing hopper 10 exemplified here is structured to include: a main body 20 and a gate (opening/closing member) 30.

A plurality of the weighing hoppers 10 are provided in the automatic combination scale, and all of them are similar. Therefore, a structure of one of them is described here and description of the other weighing hoppers 10 will not be provided.

The main body 20 is formed with a body base section 21 and body reinforcing sections 22. The body base section 21 has a tubular shape formed with a front sidewall extending in a state where it inclines more than other sidewalls, and has an upper end opening constituting a loading port 23 and a lower end opening constituting a dispensing port 24.

Two body reinforcing sections 22 are provided, and each of them is attached to an outer surface of the body base section 21. More specifically, the each body reinforcing sections 22 is attached to a portion of the outer surface from both of left and right sidewalls 21b to a rear sidewall 21c by diffusion bonding. Between rear extending sections 221 of these body reinforcing sections 22, an installing rod 222 (refer to FIG. 6) is provided. When this installing rod 222 is supported by a support mechanism provided at a predetermined portion of an automatic combination scale body (not illustrated), the main body 20 (weighing hopper 10) is installed to the automatic combination scale body.

On the lower sides of portions of the body reinforcing sections 22 joined to the outer surfaces of both left and right sidewalls 21b of the body base section 21, shaft shaped sections 25 are provided.

The inner surface of the main body 20 as described above, that is, a portion forming an inner surface of the container of the weighing hopper 10 has been embossed to form a plurality of protrusions 20a protruding inward. Thus, on the outer surface of the main body 20, a plurality of recesses 20b are formed at positions corresponding to the protrusions 20a.

A gate 30 is formed with a gate base 31 and a gate reinforcing section 32. The gate base 31 is a member having a substantially flat plate shape formed by bending both left and right side sections, and has a size that is sufficient to cover the dispensing port 24 (lower end opening) of the body base section 21.

The gate reinforcing section 32 is attached to the outer surface on the base end side of the gate base 31 by diffusion bonding. In the gate reinforcing section 32 as described above, front extending sections 321 extending to the front side are formed by bending both left and right side sections of the gate reinforcing section 32, and through holes 33 are formed in the tip portions of the respective front extending sections 321. These through holes 33 have a side that is necessary and sufficient for the shaft shaped sections 25 provided on the body reinforcing sections 22 to penetrate therethrough.

Therefore, by attaching the gate 30 to the main body 20 in a way that the shaft shaped sections 25 of the body reinforcing sections 22 penetrate through the through holes 33 of the gate reinforcing section 32, the gate 30 can swing about the shaft center of the shaft shaped sections 25 as illustrated by an arrow in FIG. 2. Thus, the dispensing port 24 of the main body 20 (body base section 21) can be opened and closed.

In the above-described gate reinforcing section 32, a rear extending section 322 extending to the rear side is formed by bending a tongue-shaped portion in the center. In the tip portion of this rear extending section 322, an insertion hole 34 is formed, and a component on one end of a link mechanism (not illustrated) is to be inserted through the insertion hole 34. Note that when a component of this link mechanism on the other end enters into U-shaped grooves 26 formed in the tip portions of rear extending sections 221 of the body reinforcing sections 22, the link mechanism intervenes between the rear extending section 322 of the gate reinforcing section 32 and the rear extending sections 221 of the body reinforcing sections 22.

Figure 7:
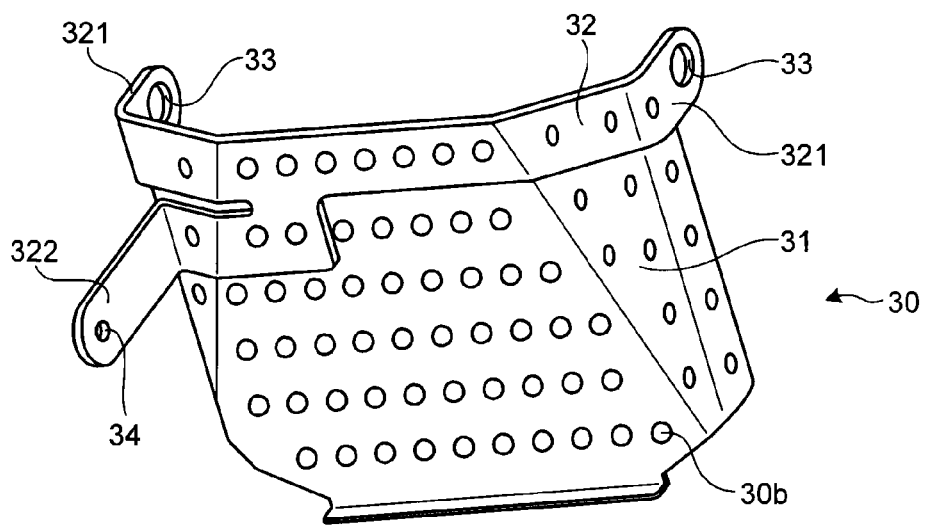
FIG. 7 is a perspective view illustrating a gate.

The inner surface of the gate 30 as described above, that is, the portion forming the inner surface of the container of the weighing hopper 10 has been embossed to form a plurality of protrusions protruding inward, which are not clearly illustrated in FIG. 2 (refer to FIG. 7). Thus, on the outer surface of the gate 30, a plurality of recesses 30b are formed at positions corresponding to the protrusions.

In the weighing hopper 10 as described above, the dispensing port 24 is closed with the gate 30 moved to close in normal state. Therefore, food supplied from the corresponding feed container 5 and loaded through the loading port 23 can be temporarily retained in the inside of the weighing hopper 10. Then, when the dispensing port 24 is opened with the gate 30 moved to open by a dispense instruction given from the calculating device (not illustrated), the weighing hopper 10 dispenses the food temporarily retained therein through the dispensing port 24 toward the chute 6 that is provided in a region below the weighing hopper 10.

The weighing hopper 10 structured as described above may be manufactured as follows.

Figure 3:
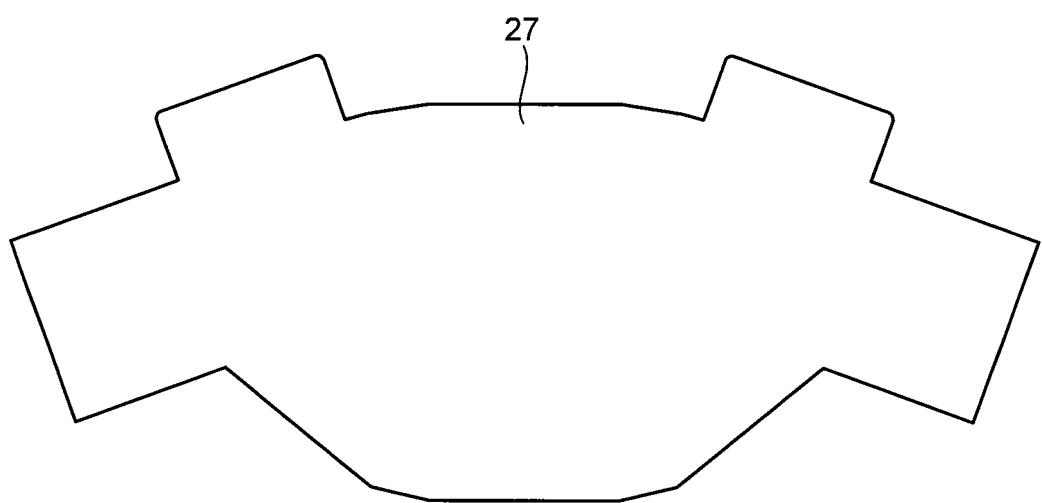
FIG. 3 is an illustration view illustrating a body base section component.
Figure 4:
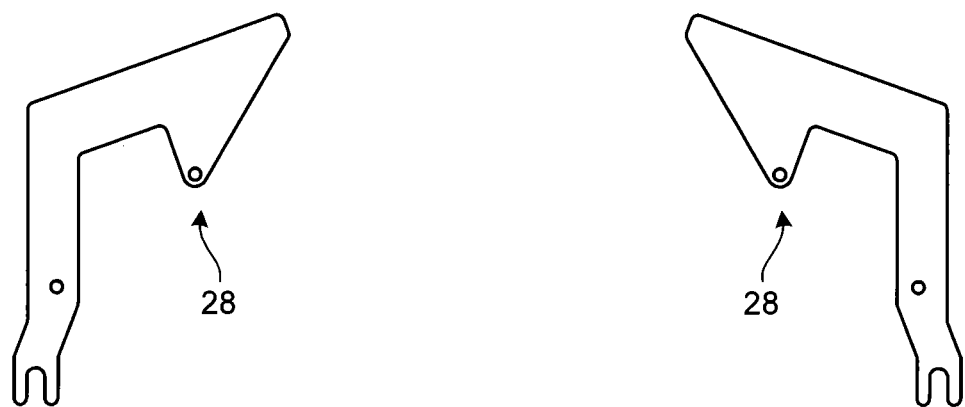
FIG. 4 is an illustration view illustrating body reinforcing section components.

A metal flat plate made of stainless, for example, is cut to form a member (body base section component) 27 having a shape of the developed body base section 21 as illustrated in FIG. 3, and to form a member (body reinforcing section component component) 28 having a shape of the developed body reinforcing sections 22 as illustrated in FIG. 4.

Figure 5:
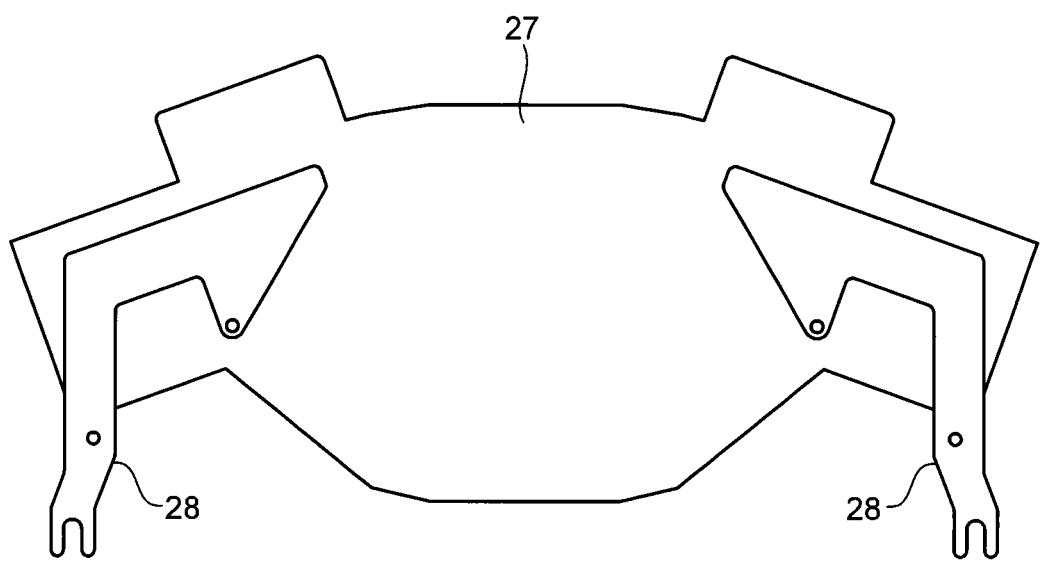
FIG. 5 is an illustration view illustrating a state where the body reinforcing section components illustrated in FIG. 4 are placed on the body base section component illustrated in FIG. 3 and they are joined by diffusion bonding.

Then, the body reinforcing section component 28 is placed on a predetermined position of the body base section component 27, and the both members 27 and 28 are diffusion bonded as illustrated in FIG. 5 under desired conditions. More specifically, they are diffusion bonded under conditions where the temperature is 800 to 1200° C., for example, and the Vickers hardness of the both members 27 and 28 is 120 to 200, for example. The both members 27 and 28 are diffusion bonded as described above, and thus these members 27 and 28 are of a soft material.

Then, the portions of the both members 27 and 28 having been diffusion bonded that are to form the inner surface of the container are embossed in such a manner that plural protrusions 20a are formed (refer to FIG. 7). As described above, the both members 27 and 28 are of a soft material due to diffusion bonding, and thus the inner surface of the container corresponding to the joining portions of the both members 27 and 28 can be successfully embossed, which has been difficult using conventional welding or the like.

Figure 6:
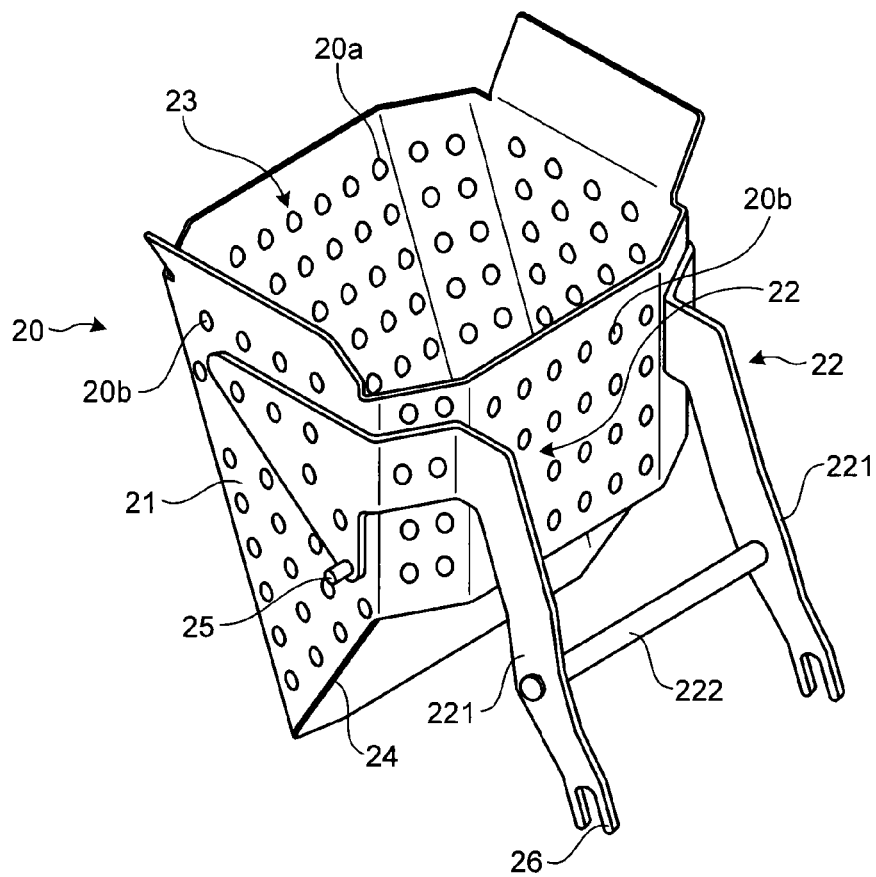
FIG. 6 is a perspective view illustrating a main body formed by bending the components illustrated in FIG. 5.

Thereafter, the both members 27 and 28 which have been diffusion bonded and necessary portions of which have been embossed as illustrated in FIG. 6 are bent using a dedicated die, and surface processing (cleaning, buffing) and the like are performed on the members 27 and 28 so as to form the main body 20.

The both members 27 and 28 that has been diffusion bonded are embossed and bent as described above so that both members 27 and 28 are hardened due to plastic deformation to have the Vickers hardness from about 120 to about 300, which improves the wear resistance and the like of the members 27 and 28.

Similarly to the main body 20, a metal flat plate made of stainless, for example, is cut to form a member (gate base component) having a shape of the developed gate base 31 and a member (gate reinforcing section component) having a shape of the developed gate reinforcing section 32, which are not illustrated. Then, the gate reinforcing section component is placed on a predetermined position of the gate base component, and the both members are diffusion bonded under desired conditions. More specifically, they are diffusion bonded under conditions where the temperature is 800 to 1200° C., for example, and the Vickers hardness of the both members is 120 to 200, for example. The both members are diffusion bonded as described above, and thus these members are of a soft material.

Then, the portions of the both members diffusion bonded that are to form the inner surface of the container are embossed in such a manner that a plurality of protrusions are formed. As described above, the both members are of a soft material due to diffusion bonding, and thus the inner surface of the container corresponding to the joining portions of the both members can be successfully embossed, which has been difficult using conventional welding or the like.

Thereafter, the both members which have been diffusion bonded and necessary portions of which have been embossed as illustrated in FIG. 7 are bent using a dedicated die, and surface processing (cleaning, buffing) and the like are performed so as to form the gate 30.

The thus formed gate 30 is attached to the body reinforcing sections 22 in a way that the shaft shaped sections 25 penetrate through the through holes 33 of the front extending section 321 so that the weighing hopper 10 as illustrated in FIG. 2 can be manufactured.

As described above, in the container (the weighing hopper 10) according to this embodiment, the main body 20 and the gate 30 are respectively formed by joining their components by diffusion bonding, embossing portions forming the inner surface of the container, and then bending the components. Therefore, an interface between the body base section 21 and the body reinforcing sections 22, and an interface between the gate base 31 and the gate reinforcing section 32 disappear, and the both pairs can be integrated structures without any gap between their components. In addition, a soft material resulted from the thermal history due to diffusion bonding is embossed. Thus, a desired portion can be successfully embossed without generating any gap between the components and the components can be bent. Therefore, a situation where a part of food enters between the components of the main body 20 or the gate 30 can be prevented, and the container can be hygienic.

Consequently, with the container (the weighing hopper 10) according to this embodiment, sanitary property can be preferable.

Hereinbefore, a preferable embodiment of the present invention has been described but the present invention is not limited thereto and various modifications are possible.

In the above-described embodiment, the main body 20 and the gate 30 are respectively formed by joining their components by diffusion bonding, embossing portions forming the inner surface of the container, and then bending the components. However, in the present invention, the main body and the opening/closing member (gate) may be respectively formed by joining their components by diffusion bonding, bending them, and then embossing portions forming the inner surface of the container. More specifically, the embossing step and bending step in the embodiment may be switched. By embossing after bending as described above, it is possible not to emboss edge line portions formed by bending, and thus, the resultant container can have excellent design in addition to excellent sanitary property.

In the above-described embodiment, the body base section 21 and the body reinforcing sections 22 are closely attached in such a manner that a joining interface disappears by diffusion bonding, and the gate base 31 and the gate reinforcing section 32 are closely attached in such a manner that a joining interface disappears by diffusion bonding. However, in the present invention, the components of the main body, and the components of the gate may be closely attached in such a manner that leakage is not caused or closely attached in an area ratio that does not cause breakage due to plastic working or cutting process by diffusion bonding. Also with this structure, gaps between the both pairs can be eliminated, a situation where a part of object enters between the components of the main body or the gate can be prevented, and the main body and the gate can be hygienic.

In the above-described embodiment, the container according to the present invention is described as the weighing hopper 10 of the automatic combination scale. However, a container according to the present invention may be applied to a food delivery member provided in a food delivery device or a food retaining member provided in a food weighing device. Specifically, the application field is not limited to the weighing hopper 10 as an example of the food retaining member, and the container may be applied to a cross head feeder as an example of the food delivery member in this embodiment, a feed container and a collect container of the automatic combination scale, and the like, for example.

In the above-described embodiment, the body base section 21 and the body reinforcing sections 22 constituting the main body 20 are diffusion bonded, and the gate base 31 and the gate reinforcing section 32 constituting the gate 30 are diffusion bonded. However, in the present invention, not only a base section and a reinforcing section but various components of the main body and the gate may be joined by diffusion bonding.

In the above-described embodiment, the main body 20 and the gate 30 are embossed. However, in the present invention, either the main body 20 or the opening/closing member (gate 30) may be embossed. In addition, in the above-described embodiment, the main body 20 and the gate 30 are both made of stainless. However, in the present invention, either the main body 20 or the opening/closing member (gate 30) may be made of stainless.

REFERENCE SIGNS LIST

1 cross head feeder
2 distribution feeder
3 linear feeder
4 vibrator
5 feed container
6 chute
7 collecting chute
8 collect container
9 packaging machine
10 weighing hopper
10*a* load detector
20 main body
20*a* protrusion
20*b* recess
21 body base section
22 body reinforcing section
23 loading port
24 dispensing port
27 body base section component
28 body reinforcing section component
30 gate
30*b* recess
31 gate base
32 gate reinforcing section

The invention claimed is:

1. A container comprising:
a main body, at least an inner surface of which is used to deliver an object, wherein
the main body is formed by bending components after joining the components by diffusion bonding, wherein
at least a part of a portion joined by the diffusion bonding is bent,
the part being bent has higher Vickers hardness than a remaining part of the portion joined by the diffusion bonding, and
an interface between the components has disappeared at the portion joined by the diffusion bonding.

2. The container according to claim 1, wherein
the main body is formed in a tubular shape of which upper end opening constitutes a loading port and a lower end opening constitutes a dispensing port,
the container further comprising an opening/closing member provided on the main body swingably in a way that the opening/closing member opens/closes the dispensing port, and
the main body and the opening/closing member are formed by bending their components after joining their components by diffusion bonding.

3. The container according to claim 2, wherein at least one of the main body and the opening/closing member is formed by bending the components after joining components by diffusion bonding and embossing a portion to form an inner surface of the container.

4. The container according to claim 2, wherein at least one of the main body and the opening/closing member is formed by embossing a portion to form an inner surface of the container after joining the components by diffusion bonding and bending the components.

5. The container according to claim 2, wherein at least one of the main body and the opening/closing member is made of stainless.

6. The container according to claim 3, wherein at least one of the main body and the opening/closing member is made of stainless.

7. The container according to claim 4, wherein at least one of the main body and the opening/closing member is made of stainless.

8. The container according to claim 1, wherein at least a part of a portion joined by the diffusion bonding is bent by the bending.

\* \* \* \* \*